Dec. 4, 1928.
G. W. ELSEY
1,694,005
MACHINE FOR TESTING SHOCK ABSORBERS
Filed May 28, 1926
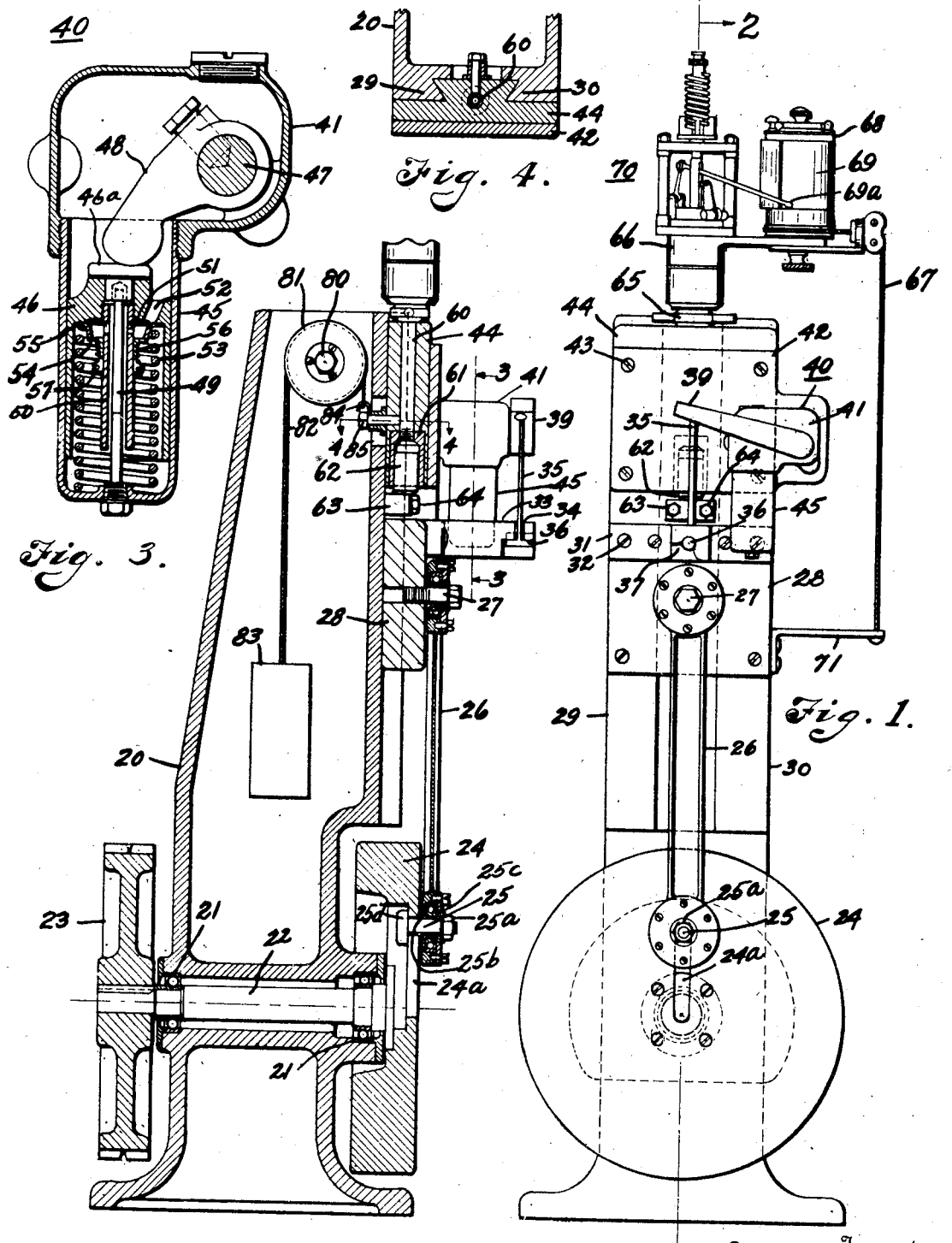
Inventor
George W. Elsey
By Spencer Small & Hardman
his Attorneys Patented Dec. 4, 1928.

1,694,005

UNITED STATES PATENT OFFICE.

GEORGE W. ELSEY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

MACHINE FOR TESTING SHOCK ABSORBERS.

Application filed May 28, 1926. Serial No. 112,264.

This invention relates to motion retarding devices, such as vehicle rebound checks, and includes among its objects the determination of the motion-checking action of such a device throughout the range of its operating movements. This object is accomplished by a machine upon which a rebound check may be mounted and by which said rebound check may be operated to retard movement in a certain direction. The machine includes means for recording the motion-retarding forces produced by the rebound check throughout its entire range of operation.

Further objects and advantages of the present invention will be apparent from the following description, reference being had to the accompanying drawings, wherein a preferred form of the present invention is clearly shown.

In the drawings:

Fig. 1 is a front elevation of a machine embodying the present invention;

Fig. 2 is a vertical sectional view thereof, taken substantially on the line 2—2 of Fig. 1;

Figs. 3 and 4 are sectional views taken, respectively, on the lines 3—3 and 4—4 of Fig. 2, and these figures are drawn to a larger scale than the other figures.

Referring to the drawings, the testing machine comprises a pedestal 20 which provides bearings 21 for a shaft 22 carrying adjacent one end a gear 23 and adjacent the other end a flywheel 24. The flywheel 24 carries a crankpin 25 which is connected by a link 26 with a pin or bolt 27 carried by a crosshead member 28. The member 28 is slidable between ways 29 and 30 provided by the pedestal 20. A bracket 31 is secured by screws 32 to the crosshead 28 and includes an extension 33 provided with a notch 34 for receiving a cable 35. The cable 35 is attached at its lower end to a crosspin 36 which is adapted to be received by a notch 37 provided by the bracket extension 33.

The upper end of the cable 35 is connected with the operating arm 39 of a shock absorber or rebound check 40. As shown more particularly in Fig. 3, the rebound check 40 includes a housing 41 adapted to be attached in any suitable manner to the frame of a vehicle, the operating arm 39 being attached to the vehicle axle. A plate 42, which is attached by screws 43 to a vertically slidable block 44, provides a bracket for mounting the shock absorber upon the testing machine. By any suitable means (not shown), the housing 41 is secured to the bracket plate 42. The housing 41 supports a cylinder 45, within which a piston 46 is slidable. The operating arm 39 is connected with a shaft 47 carrying a lever 48 which is adapted to bear upon a wear piece 46ᵃ mounted upon the piston 46. A relatively viscous liquid, such as lubricating oil, is placed within the cylinder 45. Downward movement of the arm 39, as viewed in Fig. 1, would produce downward movement of the piston 46. This downward movement is retarded, since all of the liquid which is below the piston head must pass through a duct of relatively small flow-capacity which is provided by the annular space between a pin 49, supported by the bottom of the cylinder 45, and a metering tube 50 which is attached to the head of the piston 46 and which is provided with side passages 51 communicating with one or more passages 52 extending through the head of the piston. When the operating arm 39 is moved upwardly a spring 53, located between the piston and the bottom of the cylinder, will cause the piston to move upwardly. During upward movement of the piston 46 the liquid, which is above the piston head, may flow to the space left below the piston head through a duct of relatively great flow-capacity, which is provided by the opening of a check valve 54. The valve 54 is maintained upon its seat 55 by a spring 56 located between the valve 54 and a washer 57 which is supported by the tube 50.

The block 44 is also vertically slidable between the ways 29 and 30, and is provided with a bore for receiving a pipe 60 which is connected with a small cylinder 61 which occupies a suitable recess provided by the block 44. The cylinder 61 receives a piston 62 which bears at its lower end against a block 63 attached by screws 64 to the pedestal 20. The upper end of the pipe 60 is connected by a coupling 65 with the pressure cylinder 66 of a pressure-stroke indicator 70. As any known type of pressure-stroke indicator may be used, a detailed description thereof is considered unnecessary. The cord 67, which is used to rotate the drum 68 carrying the paper 69 upon which an indication is made, is attached to a bracket 71 carried by the crosshead 28.

The pedestal 20 carries a stub shaft 80 which supports for rotation a grooved pulley 81 about which is passed a cable 82 connected at one end with a weight 83 and at the other end with a clip 84. The clip 84 is attached by a screw 85 to the plate 44. The mass of the weight 83 is sufficient to counterbalance the plate 44 and the parts supported thereby, including the rebound check or shock absorber 40.

Before attaching the indicator 70 to the pipe 60, the pipe and the cylinder 61 are substantially filled with a liquid, such as lubricating oil, the piston 62 plugging the lower end of the cylinder 61. The machine is adjusted until the cylinders 61 and 66, and the pipe 60 are filled with oil, and so that the indicator will respond immediately to any downward pull exerted upon the lever 39. The flywheel 24 is rotated by any suitable power device connected with the gear 23. If the shock absorber 40 offered no appreciable resistance to downward movement of the lever 39, the shock absorber would not transmit motion from the crosshead 28 to the plate 44 as the crosshead 28 moves downwardly. Therefore, the indicator would not record pressures upon the card 69 above the zero line. Due to the resistance offered by the shock absorber 40 to the downward movement of the lever 39, the shock absorber constitutes a yielding link connecting the crosshead 28 with the plate 44. Therefore, the rebound-checking or motion-retarding effect produced by the shock absorber will manifest itself by increases in pressure of the liquid within the cylinder 61. As the indicating marker 69ᵃ will move upwardly in accordance with the amount to which the pressure of the liquid in the cylinder 61 has increased, and, as the drum 68 is moved in accordance with the movement of the lever 39, the indicator will draw upon the card 69 a diagram which represents the rebound-checking or motion-retarding effect produced by the shock absorber at different positions of the lever 39 throughout its entire range of movement. As the relative movement between the crosshead 28 and the plate 42 represents the relative movement between the frame and axle of a vehicle body, the indicator diagram will represent the rebound-checking effect which will be produced by the shock absorber when connected between the vehicle frame and axle. Therefore, the present invention may be used to aid the experimental engineer to determine in advance of installing a shock absorber upon an automobile what changes in construction of the shock absorber should be made in order to accomplish a certain desired result. The machine may be used by a manufacturer of shock absorbers, in order to determine whether the performance of the shock absorber is in conformity to a certain desired standard.

The stroke of the crosshead may be varied by changing the eccentricity of the crankpin 25. This may be done by loosening a nut 25ᵃ and sliding the pin 25 along a slot 24ᵃ in the flywheel 24 through which the pin extends. By tightening the nut 25ᵃ, the pin 25 will be clamped in the desired position of adjustment, since a portion of the flywheel 24, a bearing race 25ᵇ and a washer 25ᶜ are clamped between the nut 25ᵃ and the head 25ᵈ of the pin 25. In this way, the shock-absorbing effect may be recorded for different positions of the shock absorber lever 39 within a certain limited range of movement. This adjustment may be made also for the purpose of adapting the testing machine for other types and sizes of shock absorbers.

It will be understood that the present invention is adapted to be used for testing any type of shock absorber or rebound check, a certain type of shock absorber having illustrated merely for the purpose of showing the manner of using the testing machine.

I claim:

1. Apparatus for testing shock absorbers comprising, in combination, a pair of relatively movable members, one member being adapted to support the shock absorber and the other adapted to be attached to the operating part of the shock absorber, means for producing movement of one of the members relative to the other, and means for indicating and recording the force transmitted between the members by the shock absorber throughout the operation of the shock absorber.

2. Apparatus for testing shock absorbers comprising, in combination, a pair of relatively movable members, one member being adapted to support the shock absorber and the other adapted to be attached to the operating part of the shock absorber, means for producing movement of one of the members relative to the other, cooperating cylinder and piston elements one of which is carried by the member which is relatively stationary, a stationary stop engaging the other of said elements for limiting its movement in one direction, said cylinder being adapted to contain a liquid, and a pressure-stroke indicator having its pressure cylinder connected with said cylinder and its drum-operating cord connected with the movable member.

3. Apparatus for testing shock absorbers comprising, in combination, a pair of relatively movable members, one member being adapted to support the shock absorber and the other adapted to be attached to the operating part of a shock absorber, means for producing movement of one of the members relative to the other, a cylinder carried by the relatively stationary member, a piston slidable within the cylinder, a stationary stop engaging the piston for limiting its movement in one direction, said cylinder being adapted to contain a liquid, and a pressure-stroke indicator having its pressure cylinder connected with said cylinder and its drum-operating cord connected with the movable member.

4. Apparatus for testing shock absorbers comprising, in combination, a pair of relatively movable members, one member being adapted to support the shock absorber and the other adapted to be attached to the operating part of the shock absorber, means for producing movement of one of the members relative to the other, devices for adjusting said means in order to vary the amount of said relative movement, and means for indicating and recording the force transmitted between the members by the shock absorber throughout the operation of the shock absorber.

5. Apparatus for testing shock absorbers comprising, in combination, a pair of vertically movable members, one member being adapted to support the shock absorber and the other adapted to be attached to the operating part of the shock absorber, means for counterbalancing the weight of the member supporting the shock absorber and the shock absorber supported by it, means for producing movement of one of the members relative to the other, and means for indicating the force transmitted between the members by the shock absorber throughout the range of movement of the operating part of the shock absorber.

6. Apparatus for testing shock absorbers comprising, in combination, a pair of vertically movable members, one member being adapted to support the shock absorber and the other adapted to be attached to the operating part of the shock absorber, means for counterbalancing the shock absorber support and the shock absorber carried by it, means for producing movement of one of the members relative to the other, devices for adjusting said means in order to vary the amount of said relative movement, and means for indicating the force transmitted between the members by the shock absorber throughout the range of movement of the operating part of the shock absorber.

7. Apparatus for testing a shock absorber having a frame adapted to be attached to a vehicle frame and an operating part adapted to be attached to the vehicle axle, comprising in combination, a member for supporting the shock absorber frame, a member for connection with the operating part, means for producing relative movement between said members, means for guiding said members so that they will move only in the direction which approximates the normal direction of relative movement between the shock absorber frame and operating part when the shock absorber is in use on a vehicle, and means for indicating the force transmitted between the members by the shock absorber.

8. Apparatus for testing a shock absorber having a frame adapted to be attached to a vehicle frame and a pivoted operating arm adapted to be attached to the vehicle axle, comprising in combination, a support for the shock absorber frame, a member for connection with the operating arm, means for producing relative movement between said members only in a direction which approximates the normal direction of relative movement between the shock absorber frame and operating arm when the shock absorber is in use on the vehicle, and means for resisting movement of one member when moved by the other through force transmitted through the shock absorber, said resisting means including provisions for indicating the force exerted by the shock absorber.

9. Apparatus for testing a shock absorber having a frame adapted to be attached to a vehicle frame and a pivoted operating part adapted to be attached to the vehicle axle, comprising in combination, a member for supporting the shock absorber frame, a member for connection with the operating arm; means for producing movement of the second member relative to the first only in a direction which approximates the normal direction of movement between the shock absorber frame and operating arm when the shock absorber is in use on the vehicle; means for guiding the first member for limited movement only in said direction of movement of the second member relative to the first; and means for resisting movement of the first member and including provisions for indicating the force transmitted between the members by the shock absorber.

In testimony whereof I hereto affix my signature.

GEORGE W. ELSEY.